United States Patent [19]

Clapper, Jr.

[11] Patent Number: 5,348,299
[45] Date of Patent: Sep. 20, 1994

[54] ELECTRONIC GAMING APPARATUS

[75] Inventor: Ronald C. Clapper, Jr., Chatsworth, Calif.

[73] Assignee: LTB Game Enterprises, Chatsworth, Calif.

[21] Appl. No.: 879,747

[22] Filed: May 6, 1992

[51] Int. Cl.$^5$ ............................................. A63F 9/24
[52] U.S. Cl. .............................. 273/138 A; 273/138 R
[58] Field of Search ............... 273/138 A, 139, 143 R

[56] References Cited

U.S. PATENT DOCUMENTS

| | | | |
|---|---|---|---|
| 4,689,742 | 8/1987 | Troy et al. | 273/138 A |
| 4,725,079 | 2/1988 | Koza et al. | 273/139 |
| 4,842,278 | 6/1989 | Markowicz | 273/138 A |

FOREIGN PATENT DOCUMENTS 888155 12/1981 U.S.S.R. ................... 273/138 A

OTHER PUBLICATIONS

Virginia Lottery—Instant Ticket Vending Machine Brochure.

Primary Examiner—Benjamin H. Layno
Attorney, Agent, or Firm—Robert J. Schaap

[57] ABSTRACT

An electronic gaming apparatus which preferably corresponds to and effectively electronically automates the game of chance known as "Pull-Tab." A primary strip of indicia in the form of a roll is provided in the apparatus and upon actuation of the apparatus, a segment of the strip is severed to provide a strip segment or ticket and is dispensed. If the indicia on the severed segment corresponds to a winning indicia, then the player would win the game. A duplicate copy of each severed segment of the primary strip is maintained on a duplicate strip and stored for purposes of later auditing. In addition, an electronic display is provided on the apparatus. The primary or duplicate strip of indicia contains a code corresponding to the indicia printed on each dispensed segment. This code is read as a segment of the strip is dispensed and simultaneously displayed on the screen.

11 Claims, 4 Drawing Sheets

ELECTRONIC GAMING APPARATUS

BACKGROUND OF THE INVENTION

1. Field of the Invention

This invention relates in general to certain new and useful improvements in electronic gaming apparatus, and more particularly, to a gaming apparatus which is capable of dispensing selected segments of a strip containing indicia and maintaining a duplicate copy thereof, as well as displaying the indicia on the strip segment which is dispensed.

2. Brief Description of the Prior Art

In the conventional game of Pull-Tab, frequently played in gaming establishments, a large number of cards, or similar substrates, are located in a box or other open container. Each of the cards are printed with some type of indicia which may be a number, a symbol or the like and only a limited number of the cards in this box or other container have a winning indicia. Each of the indicia are covered by a removable cover sheet having a tab thereon.

A dealer, upon appropriate payment by a player, will remove one of the cards from the container and provide the same to a player. Since the indicia are covered by the removable cover sheet, and since the cards with winning indicia are randomly located within the container, neither the dealer nor the player know if the player is receiving a card with a winning indicia until such time as the tab is engaged and the cover sheet is removed.

The present invention relies on an innovation which electronically enhances this game and other similar games which utilize selection of randomly arranged substrates having indicia thereon.

OBJECTS OF THE INVENTION

It is, therefore, one of the primary objects of the present invention to provide a gaming apparatus which automates a game of gambling previously played with a plurality of playing tickets in a container and adapted for dispensing from the container.

It is another object of the present invention to provide an electronic gaming apparatus of the type stated which is capable of dispensing a strip segment containing selected indicia thereon and which also maintains a duplicate copy of all strip segments which have been dispensed.

It is a further object of a further invention to provide a gaming apparatus of the type stated which is designed to provide a display of the indicia on the strip segments which may be dispensed from the apparatus upon playing thereof.

It is an additional object of the present invention to provide a method of automating a game previously played with playing pieces or substrates dispensed from an open container.

With the above and other objects in view, my invention resides in the novel features of form, construction, arrangement and combination of parts presently described and pointed out in the claims.

BRIEF SUMMARY OF THE INVENTION

The present invention relates to an electronic gaming apparatus, which in a broad aspect, is capable of dispensing a segment of a strip containing indicia thereon upon actuation of the apparatus. In a more preferred aspect, this apparatus maintains a duplicate record of the dispensed segment and particularly the indicia on that dispensed segment.

The electronic gaming apparatus contains a primary strip which can be subdivided into individual segments and which contain the indicia thereon. This strip may be in the form of a roll containing the segments and where each segment contains the indicia thereon. The apparatus also comprises a duplicate or secondary strip containing indicia thereon in substantially the same location as on the primary strip. The apparatus further comprises means for severing a segment of the primary strip and dispensing the same upon actuation of the apparatus. This apparatus will store a corresponding portion of the duplicate strip as, for example, on a take-up roll thereof.

In a more preferred embodiment, there is provided a separating means which separates the primary strip from the duplicate strip after actuation of the apparatus. In addition, a separate means for dispensing is provided which dispenses the substrate segment after cutting from the primary strip. The cutting means may be in the form of an anvil and cutting blade.

In a further embodiment of the invention, the electronic gaming apparatus is also capable of dispensing a segment of a strip containing indicia thereon and which simultaneously displays the indicia of the dispensed segment. This embodiment of the apparatus further includes a means for severing a segment of a primary strip and dispensing the same upon actuation of this apparatus. Further, the apparatus includes means for simultaneously displaying the indicia on the dispensed segment.

In the latter embodiment of the apparatus, there is provided a display screen on the apparatus for displaying the indicia. A code corresponding to the indicia is imprinted on the opposite side of the segment which contains the indicia and the apparatus includes a scanning means for scanning the code and for conversion and display of the indicia.

Preferably, the rear surface of the primary strip will contain the indicia, that is, the side of the strip in facewise contact with the secondary strip. The rear surface of the duplicate or secondary strip will contain the code which is readable by a scanner. Thus, and in this respect, the duplicate strip will serve as a type of tab and moreover, a tab which is stored. The apparatus of the invention will remove the tab, that is the duplicate strip, from the primary strip, for the user. By virtue of the fact that the indicia on the primary strip are in facewise contact with the duplicate strip, the indicia will always be in unknown to anyone who is playing the apparatus or even monitoring the play of the apparatus until the duplicate strip is separated from the primary strip. The bar code is not readable by the user or observer of the apparatus since the code is only machine readable.

The present invention thereby provides a unique and novel electronic gaming apparatus which satisfies and fulfills all of the above-identified objects and other objects which will become more fully apparent from a consideration of the forms in which the gaming device may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 1:
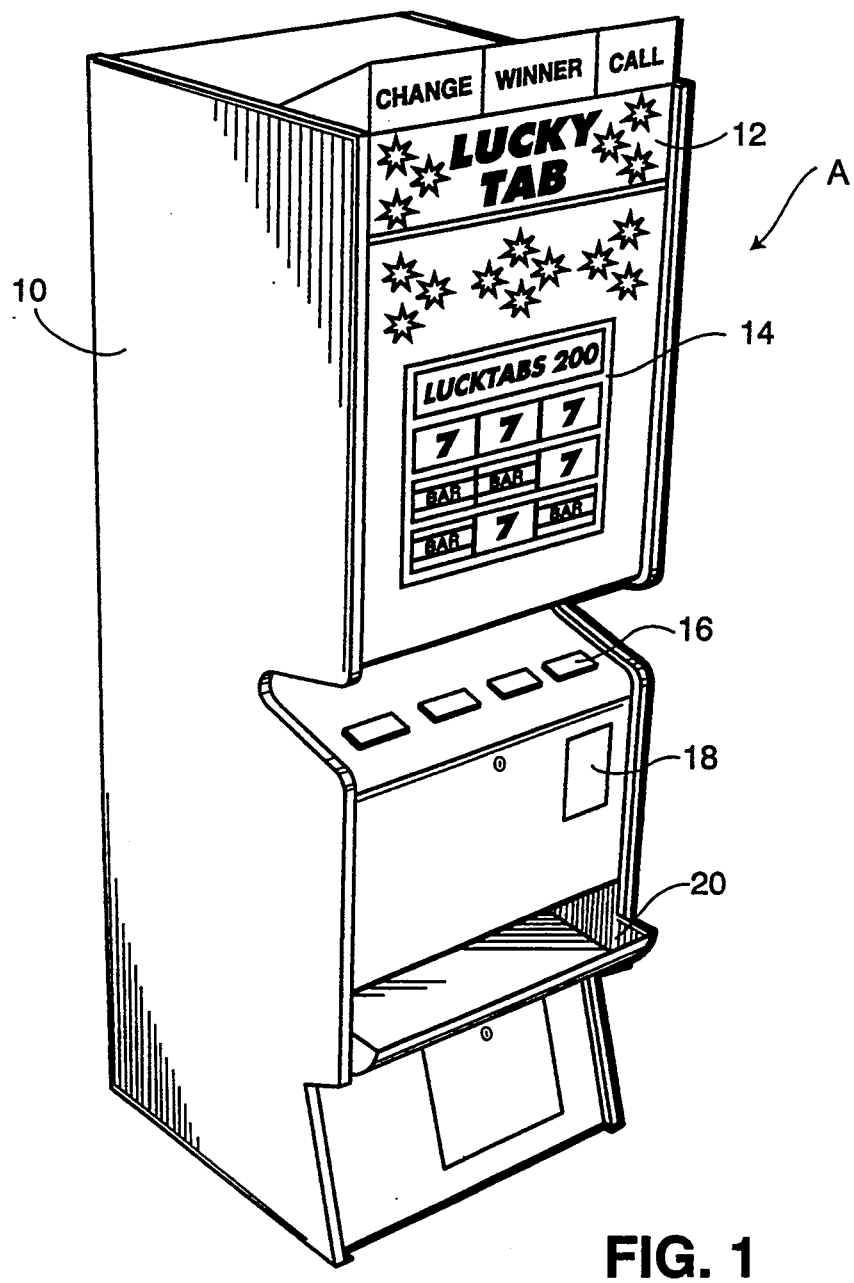
Figure 2:
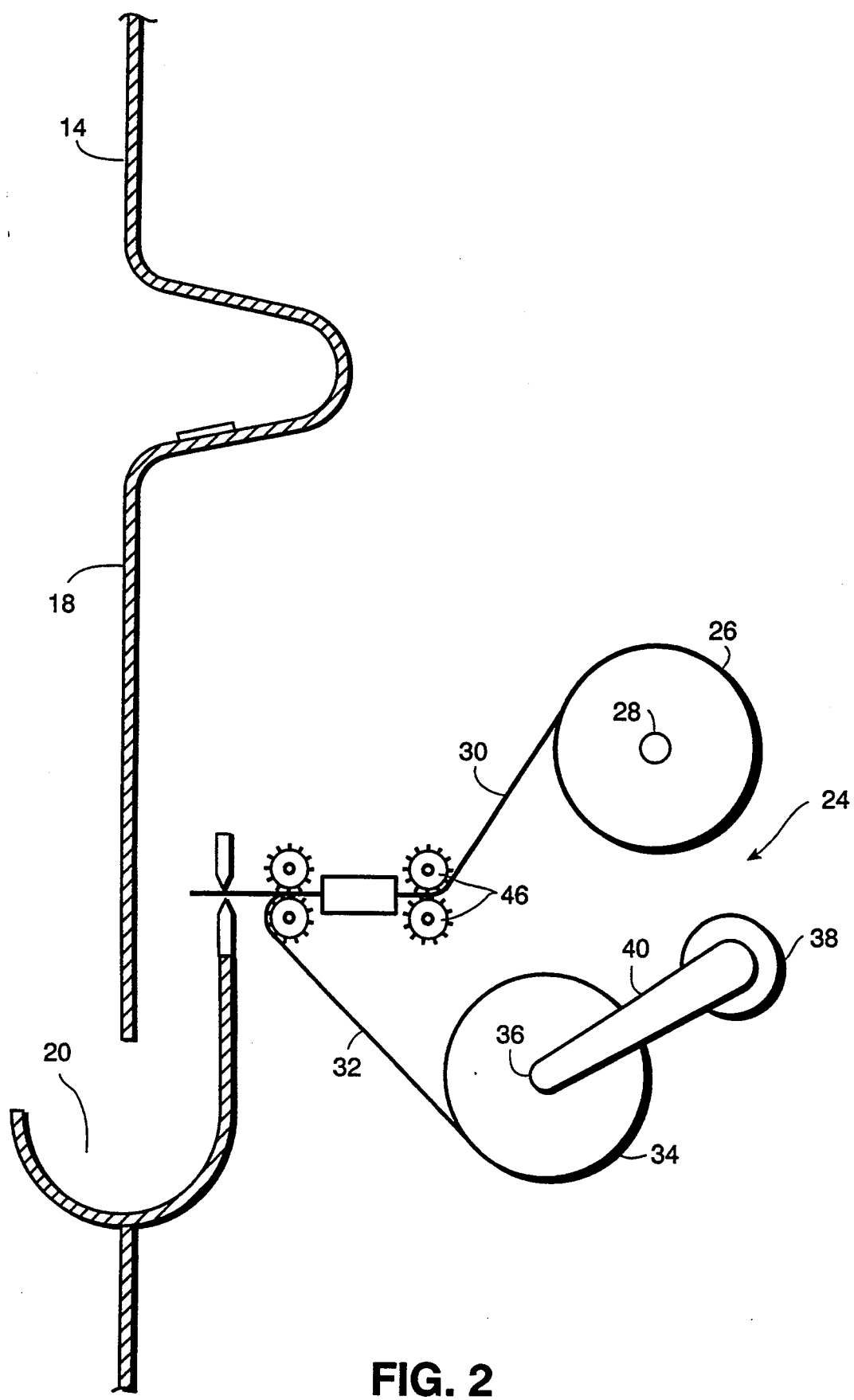
Figure 3:
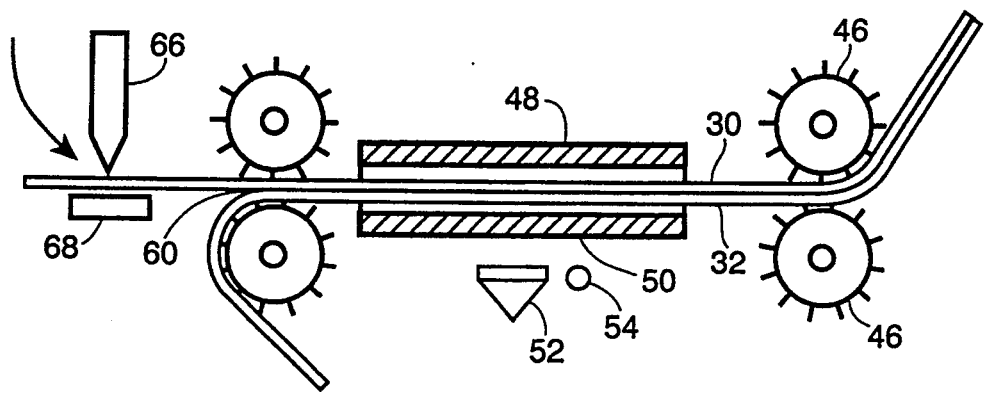
Figure 4:
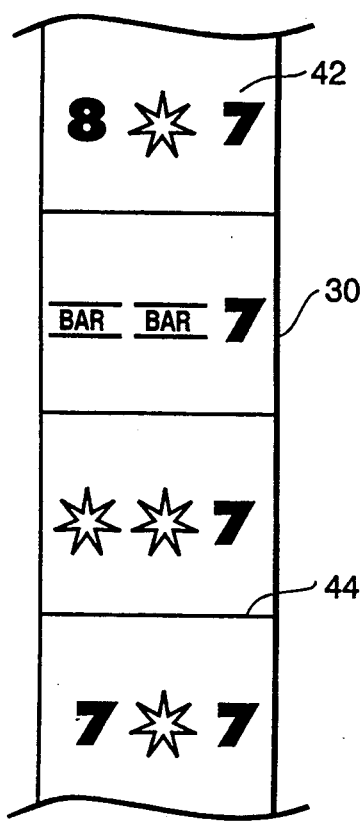
Figure 5:
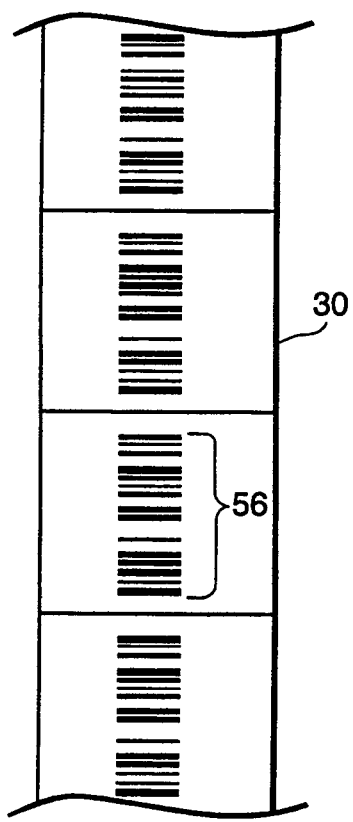
Figure 6:
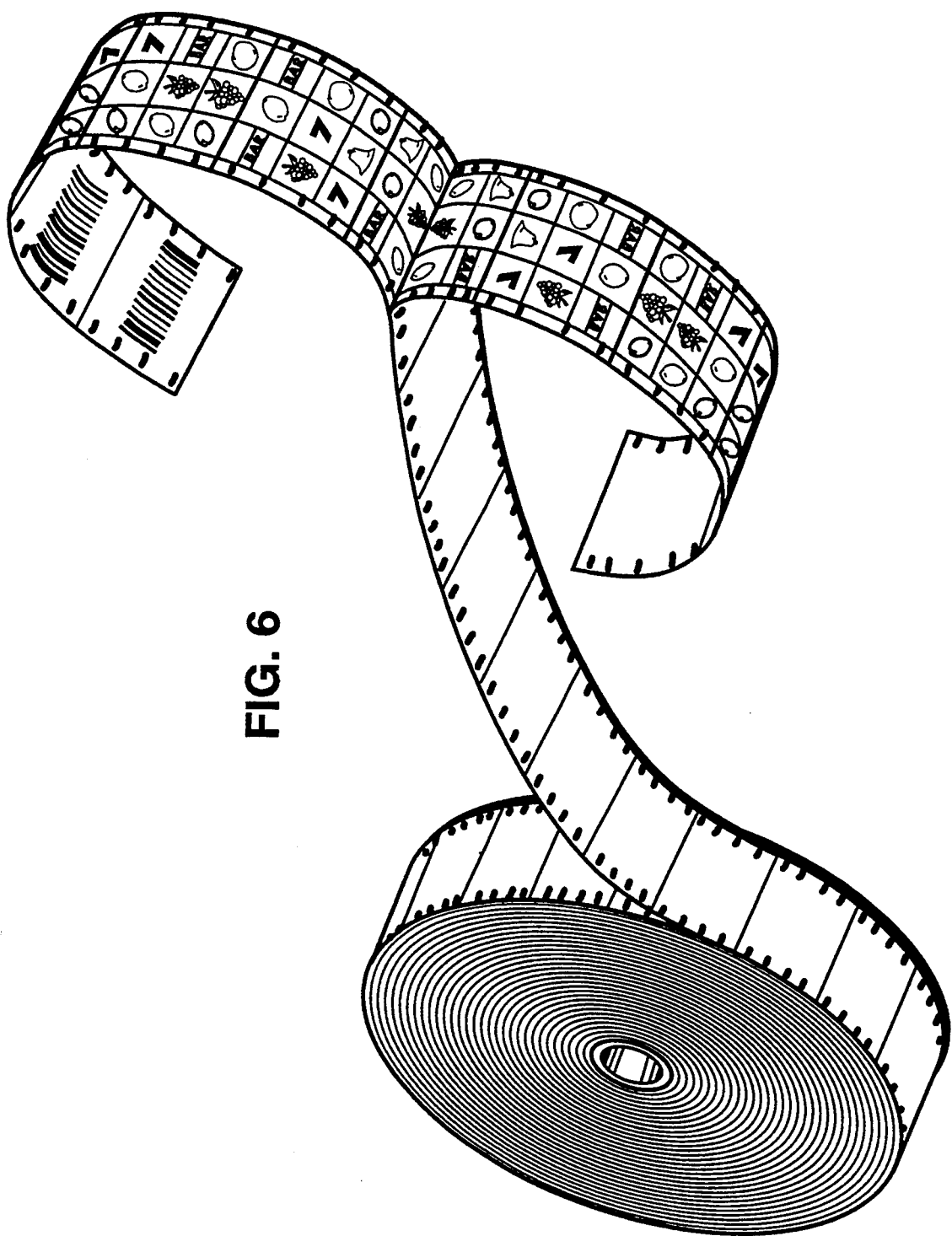

Having thus described the invention, reference will now be made to the accompanying drawings in which:

FIG. 1 is a perspective view of an apparatus constructed in accordance with and embodying the present invention;

FIG. 2 is a fragmentary perspective view showing one side of the apparatus and particularly those components necessary for feeding, scanning, severing and dispensing a strip segment along with a take-up mechanism;

FIG. 3 is a sectional view showing a portion of the scanning mechanism forming part of the apparatus of the invention;

FIG. 4 is a fragmentary view showing a rear face of a portion of a primary strip used in the apparatus;

FIG. 5 is a fragmentary view showing a rear face of a portion of a duplicate strip used in the apparatus; and FIG. 6 is a perspective view of the primary and juxtaposed duplicate strips.

DETAILED DESCRIPTION OF A PREFERRED EMBODIMENT

Referring now in more detail and by reference characters to the drawings which illustrate a practical embodiment of the present invention, A designates a gaming apparatus comprised of an upstanding housing 10 having a front face 12 with a display screen 14 capable of generating a display of indicia such as numbers or symbols, on Pull-Tab tickets, as hereinafter described.

The housing 10 is also provided with a plurality of manually actuable keys 16 which are provided for a user to actuate the apparatus as hereinafter described. The keys represent various functions which the user may select and operate the keys according to the desired function.

The gaming apparatus housing 10 is also provided with a money or currency receiver 18 which may be in the form of a coin exchanger for operating the apparatus with coins or in the form of a bill or paper currency reader. When the proper amount of money is introduced into the money receiver 18 the apparatus will be actuated in a manner to be hereinafter described in accordance with the push button switches 16.

Finally, the housing 10 is also provided with a discharge chute 20 for dispensing of Pull-Tab tickets or other type of gaming substrate segments and which are dispensed in accordance with the play of the gaming apparatus.

Referring to FIG. 2, the apparatus comprises an operating mechanism 24 comprised of a supply spool 26 suitably mounted on a supply spool spindle 28. The supply spool 26 is provided with a primary strip 30 of substrate, in the form of a roll, and which may be dispensed form the supply spool. The substrate material is usually a paper or thin paper-board material, but may effectively adopt any type of rollable or bendable material such as a thin plastic strip or the like.

The rear face of the primary strip is disposed is facewise engagement with a marginally registered duplicate strip 32 and the latter of which is trained about a take-up spool 34. The take-up spool 34 is mounted on a drive spindle 36 which is driven by a motor 38 through a drive belt 40. In this case, the motor would be actuated under the control of the microprocessor (not shown) upon proper insertion of the selected amount of money and actuation of any one of the manually actuable switches 16.

In accordance with the arrangement as illustrated in FIG. 2, it can be observed that the take-up spool 34 is the primary driving member since it is, in effect, driven by the motor 38. It should be understood that other means for driving the supply spool 36 may also be employed and synchronized to the motor 38, if desired.

The primary strip 30 is imprinted on its rear face with a plurality of indicia, such as indicia 42 which may be in the form of numbers, letters, graphic symbols, or the like. The indicia are located in separate indicia locations which are often severed into selectable segments or so-called "tickets." Each strip segment or ticket is equivalent to a pull-tab in the game of Pull-Tab. In the embodiment as illustrated, each strip segment or ticket is shown as being separated from the next adjacent strip segment on the strip by means of score lines 44. In actuality, these score lines do not exist as true perforations and moreover, are not even required since the strip itself will be cut in a manner to be hereinafter described.

The primary strip 30 and the juxtaposed duplicate strip 32 are fed from the supply spool 26 through a pair of pinch sprockets 46 and then introduced into a scanner housing 48. The scanner housing 48 is provided with an opening 50 on its undersurface and located immediately beneath the opening 50 is a conventional scanner 52 and a light source 54. The scanner may adopt the form of a charge coupled diode or similar scanning mechanism.

As the primary and juxtaposed duplicate sheets 30 and 32 pass through the scanner housing 48, the scanner 52 will read a bar code 56 on the rear surface of the duplicate sheet. This bar code 56 corresponds to the indicia 42 on the primary strip. Thus, each strip segment or ticket will have its own individual bar code corresponding to the indicia imprinted on the front surface thereof. The relationship between the indicia and the bar code is recorded in a storage mechanism and the microprocessor will access that storage mechanism in order to determine the proper indicia for display. Thereafter, the indicia is displayed on the monitor 14. In this way, the user of the apparatus will receive a ticket as hereinafter described and will also be able to observe the indicia on that ticket on the display screen 14.

The primary strip and the duplicate strip are separated by a separating mechanism, which in this case, may be a conventional wire 60 trained transversely across the path of the two strips in the manner as illustrated, in FIG. 3. In this way, the primary strip can be separated from the secondary and the latter allowed to re-wind on the take-up spool 34.

The primary strip is introduced into a cutting mechanism 64 having a cutting blade 66 cooperating with an anvil 68. The primary strip is located between the cutter 66 and the anvil 68 when a solenoid is actuated. Upon receipt of a proper signal initiated through the microprocessor, the cutting mechanism 66 will be operated by the solenoid and sever the primary strip 30 into the individual strip segments or tickets. The tickets are thereupon allowed to deposit in the discharge chute 20 where they may be picked up by the player of the apparatus. The tickets can then be taken to a cashier or like individual for purposes of collecting the money if any of the tickets carries a winning indicia thereon.

The rear face of the primary strip 30 which contains the indicia will actually be disposed in intimate facewise contact with the forward face of the duplicate strip 32. Thus, the indicia on the primary strip will not be initially observable until the apparatus separates the duplicate strip from the primary strip and dispenses the strip segment. The rear face of the duplicate strip will contain the bar code 56, as aforesaid, and this bar code is only machine readable, that is, it cannot be intelligibly read by a user or observer of the apparatus. The indicia, therefore, will not be intelligible to the player or observer until the apparatus dispenses the ticket or displays the symbols corresponding to the bar code, or both.

Thus, there has been illustrated and described a unique and novel electronic gaming apparatus and a method of use therefor which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. An electronic gaming apparatus capable of dispensing a segment of a strip containing indicia thereon upon actuating the apparatus and which maintains a duplicate record copy, said apparatus comprising:
    a) a primary strip containing indicia thereon;
    b) a duplicate strip containing indicia thereon and in essentially the same locations as on said primary strip and wherein the primary and duplicate strips are in juxtaposed relationship to one another;
    c) means for severing a segment of the primary strip and dispensing same upon actuation of the apparatus and storing a corresponding portion of the duplicate strip.

2. The electronic gaming apparatus of claim 1 further characterized in that separating means separates the primary strip from the duplicate strip after actuation of the apparatus.

3. The electronic gaming apparatus of claim 2 further characterized in that cutting means severs a segment of the strip and enables dispensing of the same.

4. An electronic gaming apparatus capable of dispensing a segment of a strip having a rear face and a front face containing indicia thereon upon actuating the apparatus and simultaneously reading and displaying the indicia in the dispensed segment, said apparatus comprising;
    a) a primary strip containing indicia on the front face thereof and a code representing the indicia on the rear face thereof and which code is unintelligible to an individual and only machine readable;
    b) a removable cover strip disposed over and concealing the indicia on the front face thereof;
    c) means for scanning the code on the rear face and connecting the code to the equivalent indicia for purposes of display;
    d) means for severing a segment of the primary strip and dispensing same upon actuation of the apparatus; and
    e) means for simultaneously displaying the code which is read and converted into indicia corresponding to the indicia on the dispensed segment, without removing the cover strip from the indicia on the strip.

5. The electronic gaming apparatus of claim 4 further characterized in that separating means separates the primary strip from a duplicate strip after actuation of the apparatus.

6. The electronic gaming apparatus of claim 5 further characterized in that cutting means severs a segment of the primary strip and enables dispensing of same.

7. The electronic gaming apparatus of claim 4 further characterized in that a display screen is on said apparatus for displaying the indicia.

8. The electronic gaming apparatus of claim 7 further characterized in that the code corresponding to the indicia which is imprinted on the front face of the segment is a bar code.

9. An electronic gaming apparatus capable of dispensing a segment of a strip containing indicia thereon upon actuating the apparatus and simultaneously displaying the indicia in the dispensed segment, said apparatus comprising;
    a) a primary strip containing indicia thereon and being in juxtaposed relationship to a duplicate strip;
    b) means for separating the primary strip from the duplicate strip upon actuation of the apparatus;
    c) means for severing a segment of the primary strip and dispensing same upon actuation of the apparatus; and
    d) means for simultaneously displaying the indicia on the dispensed segment.

10. The electronic gaming apparatus of claim 9 further characterized in that the means for severing is a cutting means which severs a segment of the primary strip and enables dispensing of same.

11. The electronic gaming apparatus of claim 9 further characterized in that a display screen is on said apparatus for displaying the indicia.

* * * * *